US010242070B2

(12) United States Patent
Rodgers

(10) Patent No.: US 10,242,070 B2
(45) Date of Patent: Mar. 26, 2019

(54) SYSTEM AND METHOD FOR ADAPTIVELY ANTICIPATING NEXT USER INTERACTIONS WITH A COMPUTER APPLICATION

(71) Applicant: ORACLE INTERNATIONAL CORPORATION, Redwood Shores, CA (US)

(72) Inventor: Michael P. Rodgers, Orange, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 459 days.

(21) Appl. No.: 15/009,994

(22) Filed: Jan. 29, 2016

(65) Prior Publication Data
US 2017/0220576 A1  Aug. 3, 2017

(51) Int. Cl.
G06F 17/30 (2006.01)
G06F 3/0482 (2013.01)

(52) U.S. Cl.
CPC ........ G06F 17/3053 (2013.01); G06F 3/0482 (2013.01); G06F 17/30554 (2013.01)

(58) Field of Classification Search
CPC ............. G06F 16/3053; G06F 17/3053; G06F 17/30554
See application file for complete search history.

(56) References Cited

U.S. PATENT DOCUMENTS

| 7,487,147 | B2 | 2/2009 | Bates et al. |
| 7,949,960 | B2 | 5/2011 | Roessler et al. |
| 8,448,089 | B2 | 5/2013 | Li et al. |
| 8,468,110 | B1 | 6/2013 | Podgorny et al. |
| 8,490,010 | B2 | 7/2013 | Stienhans |
| 2003/0090515 | A1 | 5/2003 | Chang et al. |
| 2008/0034128 | A1 | 2/2008 | Evans |
| 2011/0131479 | A1 | 6/2011 | Padgett et al. |
| 2013/0346905 | A1 | 12/2013 | Do et al. |
| 2015/0127565 | A1* | 5/2015 | Chevalier ............. G06Q 10/00 705/319 |

OTHER PUBLICATIONS

Gajos et al.; Automatically Generating Personalizede User Interfaces with Supple; pp. 1-49; May 23, 2010; downloaded from: http://www.eecs.harvard.edu/~kgajos/papers/2010/gajos10supple-aij.pdf.

* cited by examiner

Primary Examiner — Cam Y T Truong
(74) Attorney, Agent, or Firm — Kraguljac Law Group, LLC

(57) ABSTRACT

Embodiments are disclosed that provide for adaptively anticipating user interactions with a computer application. In one embodiment, an ordered history of user interactions, with controls of a computerized form provided by a legacy computer application, is captured. A likelihood data structure is generated which represents conditional probabilities indicating the likelihood that each control of the computerized form will be a next control used. A list of next likely controls to be used is generated based on the likelihood data structure. The next likely controls are ranked within the list according to conditional probability. A limited graphical user interface, representing the list of next likely controls, is generated. A next control of the computerized form to be used is regulated by displaying the limited graphical user interface.

20 Claims, 6 Drawing Sheets

SYSTEM AND METHOD FOR ADAPTIVELY ANTICIPATING NEXT USER INTERACTIONS WITH A COMPUTER APPLICATION

BACKGROUND

Enterprise resource planning software, business software, and software in general are often very complex, presenting countless screens of information to a user. The screens of information often contain a multitude of fields, some of which are rarely or never used by the user and serve to distract the user from the important controls on the screen. Furthermore, even those controls that are considered to be important are often presented in a different order from the order in which they are used. Controls are often presented in a manner where visual cues such as font size and color are absent or even misleading with respect to communicating importance.

Often, this plethora of fields stems from the fact that the software is designed to be versatile, supporting a wide variety of possible uses for different customers. However, while the software has been built to make everything possible, the effect is that it does nothing particularly well. The end result is that the software is difficult and confusing to use, difficult for new users to learn, and difficult for temporary or fill-in users to perform roles outside of their normal responsibilities. Excessive time and money are spent on training and productivity is decreased.

With the advent and proliferation of mobile and wearable interfaces, the problem has been even more pronounced. A desktop computer having a surplus of superfluous controls may be distracting. However, on a smart watch or a smart phone, such a surplus of superfluous controls can render an application completely unusable.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
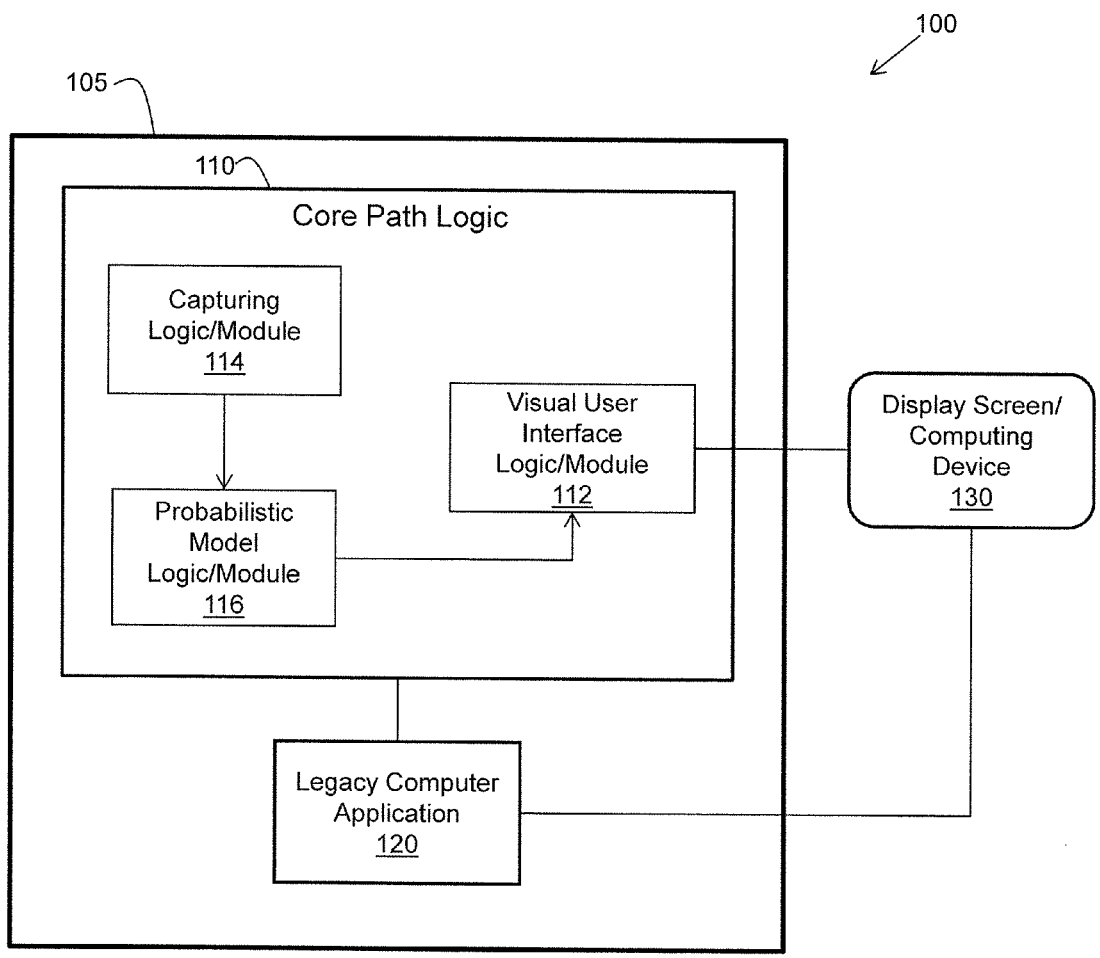
FIG. 1 illustrates one embodiment of a computer system, having a computing device configured with core path logic for adaptively anticipating next user interactions with a computer application.

Systems, methods, and other embodiments are disclosed that provide for adaptively anticipating user interactions with a legacy computer application executing on a computing device (e.g., a legacy enterprise resource planning computer application). A history of user interactions with the legacy computer application is captured and analyzed to determine which controls, of a computerized form provided by the legacy computer application, are likely to be used next by the user. The controls that are determined to likely be used next are presented to the user via a graphical user interface that is tailored to those likely controls.

In one embodiment, a core path logic is provided that determines a next set of options (a core path) that the user is likely to follow while working with the computerized form provided by the legacy computer application. The core path logic automatically captures user interactions with the legacy computer application, automatically determines the next likely user interactions, and automatically presents the next likely user interactions to the user via a limited graphical user interface. The limited graphical user interface represents a set of next likely user interactions, to the exclusion of other user interactions that are possible with respect to the computerized form.

A probabilistic model is used to analyze the captured user interactions and generate conditional probability values. The conditional probability values indicate the likelihood that each possible user interaction with the computerized form will be a next user interaction performed by the user. The probability that any particular user interaction will be a next user interaction is conditioned based on an ordered history of the previous user interactions.

The following terms are used herein with respect to various embodiments.

The term "controls", as used herein, refers to elements of a computerized form presented via a graphical user interface of a computer application. The elements may include, for example, fillable data elements and/or selectable functional elements with which a user can interact via, for example, a display screen, a computer keyboard, and a computer mouse. A control may be represented on a display screen as a display element (e.g., an icon or a field).

The term "legacy computer application", as used herein, refers to any pre-existing computer application that is configured to provide a plurality of controls to a user via a graphical user interface. For example, a legacy computer application may be configured to provide one or more computerized forms of controls that can be manipulated by a user. Operational integrity of such a legacy computer application is maintained and not affected by embodiments described herein.

The term "ordered history of user interactions", as used herein, refers to past user interactions with controls that have been captured. An ordered history of user interactions identifies both the controls and the order in which the controls were used by the user. An ordered history of user interactions may be captured in a data structure that is stored in a memory, for example. In some embodiments, the ordered history may also capture/reflect how a control was used (e.g., to what value the control was set).

FIG. 1 illustrates one embodiment of a computer system 100 (e.g., a desktop computer system, a mobile computer system, a smart phone computer system, or a web-based computer system), having a computing device 105 configured with core path logic 110 for adaptively anticipating next user interactions with a computer application. For example, in one embodiment, core path logic 110 is configured to work with a larger computer application (e.g., a legacy accounting computer application), without affecting the integrity of operation of the larger computer application. In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

Core path logic 110 is configured to computerize the process of effectively filtering out controls of a computerized form, provided by a legacy computer application, which are not likely to be used next by a user. In one embodiment, a computer algorithm is disclosed that implements an analytical approach for determining which controls are likely to be used next by a user. The embodiments described herein operate automatically and in real time as a user is interacting with a legacy computer application, without impacting the operational integrity of the legacy computer application.

With reference to FIG. 1, in one embodiment, core path logic 110 is implemented on the computing device 105 and includes logics or modules for implementing various functional aspects of core path logic 110. In one embodiment, core path logic 110 includes visual user interface logic/module 112, capturing logic/module 114, and probabilistic model logic/module 116.

Other embodiments may provide different logics or combinations of logics that provide the same or similar functionality as core path logic 110 of FIG. 1. In one embodiment, core path logic 110 is an executable application including algorithms and/or program modules configured to perform the functions of the logics. The application is stored in a non-transitory computer storage medium. That is, in one embodiment, the various logics of core path logic 110 are implemented as modules of instructions stored on a computer-readable medium.

The computer system 100 also includes a legacy computer application 120 configured to operate on the computing device 105. The legacy computer application 120 is a pre-existing computer application that is configured to provide a plurality of controls to a user via a legacy graphical user interface. For example, the legacy computer application 120 may be configured to provide one or more computerized forms of controls that can be manipulated by a user. In one embodiment, core path logic 110 is configured to work with the legacy computer application 120 without affecting the integrity of the operation of the legacy computer application 120. The legacy computer application 120 has its own visual user interface logic providing a legacy graphical user interface.

The computer system 100 also includes a display screen 130 operably connected to the computing device 105 (e.g., to visual user interface logic 112 and to a visual user interface logic of the legacy computer application 120). In accordance with one embodiment, the display screen 130 is implemented to display views of and facilitate user interaction with the legacy graphical user interface (GUI) generated by the legacy computer application 120 and a limited graphical user interface generated by visual user interface logic 112 (e.g., for viewing and interacting with controls associated with computerized forms provided by the legacy computer application 120). The limited graphical user interface may be associated with a core path application, in accordance with one embodiment.

In one embodiment, the computing device 105 is a centralized server-side application that provides at least the functions disclosed herein and that is accessed by many users via computing devices/terminals communicating with the computing device 105 (functioning as the server) over a computer network. Thus the display screen 130 may represent multiple computing devices/terminals that allow users to access and receive services from core path logic 110 via networked computer communications.

In one embodiment, visual user interface logic 112 is configured to generate a limited graphical user interface (GUI) to facilitate user interaction with computerized forms provided by the legacy computer application. For example, visual user interface logic 112 includes program code that generates and causes the limited graphical user interface to be displayed based on an adapted graphical design of the interface. In response to user actions and selections via the limited GUI, associated aspects of manipulating computerized forms are performed. The limited graphical user interface provides the controls of a computerized form that a user is likely to use next, to the exclusion of other controls of the computerized form. The limited graphical user interface can be thought of as a user interface that is "wrapped" around the legacy computer application 120.

Referring again to FIG. 1, in one embodiment, capturing logic 114 is configured to capture an ordered history of user interactions with controls of a computerized form (e.g., an accounting form or a tax form) provided by the legacy computer application 120 executing on the computing device 105. In one embodiment, capturing logic 114 is configured to leverage an existing messaging framework of the legacy computer application 120 to facilitate capturing of the ordered history of user interactions. For example, legacy computer application 120 may log messages associated with user interactions in a memory of computing device 105. Capturing logic 114 may be configured to intercept the messages as they are being written to the memory, or read the logged messages from the memory.

In one embodiment, probabilistic model logic 116 is configured to generate a likelihood data structure. The likelihood data structure represents conditional probability values that indicate the likelihood that each control of a computerized form will be a next control used by the user. In one embodiment, the likelihood data structure is generated by applying a probabilistic model to the ordered history of user interactions. Some examples of probabilistic models that may be appropriate to implement include a Bayesian type model, a Hidden Markov model, and a Maximum Entropy model.

The conditional probabilities are conditioned on an ordered history of user interactions. That is, the probability that a particular control will be the next control used by the user depends on (i.e., is conditioned on) the previous controls (and the order of the previous controls) used by the user (e.g., especially the last few controls used). Probabilistic model logic 116 is configured to generate a list of next likely controls to be used by the user based on the likelihood data structure. The next likely controls are ranked within the list according to the conditional probability values associated with the next likely controls.

In one embodiment, probabilistic model logic 116 is configured to generate a list of next likely controls by generating a sequence of cumulative probability values, of the controls as represented in the likelihood data structure, in an order from highest to lowest conditional probability value. Probabilistic model logic 116 then compares the sequence of cumulative probability values to a threshold value. In one embodiment, probabilistic model logic 116 selects, as the list of next likely controls, those controls corresponding to the cumulative probability value of the sequence that is greater than and closest to the threshold value. An example is described later herein with respect to FIG. 4.

In one embodiment, visual user interface logic 112 is configured to generate a limited graphical user interface representing the list of next likely controls, to the exclusion of other controls of a computerized form. Visual user interface logic 112 is also configured to control (regulate) a next control of a computerized form to be used by the user. For example, visual user interface logic 112 may control (regulate) a next control to be used by displaying the limited graphical user interface, representing the list of next likely controls, to the user via the display screen 130. That is, by displaying only a limited set of controls (i.e., the list of next likely controls) to the user, visual user interface logic 112 is effectively controlling or regulating the next control to be used.

In one embodiment, as a user proceeds to use a next control of a computerized form, capturing logic 114 is configured to update the ordered history of user interactions by capturing the next user interaction corresponding to the next control used by the user. In this manner, the ordered history of user interactions is adaptively updated in real time as a user interacts with the controls of a computerized form.

Furthermore, as the user continues to interact with the controls of a computerized form, probabilistic model logic 116 is configured to update the likelihood data structure based on the ordered history of user interactions, as updated by capturing logic 114. Probabilistic model logic 116 is also configured to update the list of next likely controls to be used by the user based on the likelihood data structure, as updated. In this manner, the likelihood data structure and the list of next likely controls is adaptively updated in real time as a user interacts with the controls of a computerized form.

Still further, as the user continues to interact with the controls of a computerized form, visual user interface logic 112 is configured to update the limited graphical user interface. The limited graphical user interface represents the list of next likely controls, as updated by probabilistic model logic 116, to the exclusion of other controls of the computerized form. Visual user interface logic 112 is also configured to regulate (control) a next upcoming control of the computerized form to be used by the user. A next upcoming control to be used may be regulated (controlled) by displaying the limited graphical user interface, as updated, to the user via the display screen 130.

In one embodiment, visual user interface logic 112 is configured to display the limited graphical user interface on the display screen 130 to facilitate user selection of the next control based on the conditional probability values associated with the list of next likely values. For example, the limited graphical user interface may distinctly high-light a display element associated with a control, of the list of next likely controls, having a highest conditional probability value. Alternatively, the limited graphical user interface may distinctly enlarge a display element associated with a control, of the list of next likely controls, having a highest conditional probability value. As another alternative, the limited graphical user interface may distinctly position a display element associated with a control, of the list of next likely controls, having a highest conditional probability value. Such examples are described later herein with respect to FIGS. 5A-5C.

In this manner, core path logic 110 may be implemented on (e.g., installed on) a computing device 105 hosting a legacy computer application 120. Core path logic 110 interacts with the legacy computer application 120 without affecting the operational integrity of the legacy computer application 120. Core path logic 110 provides an adaptive graphical user interface that provides a limited view to controls of computerized forms provided by the legacy computer application 120. The limited view provides those controls that are most likely to be used next by the user, based on a conditional probability analysis of past user interactions. In this way, the user is not overwhelmed by being shown a large number of controls, most of which the user in not currently interested in using.

Figure 2:
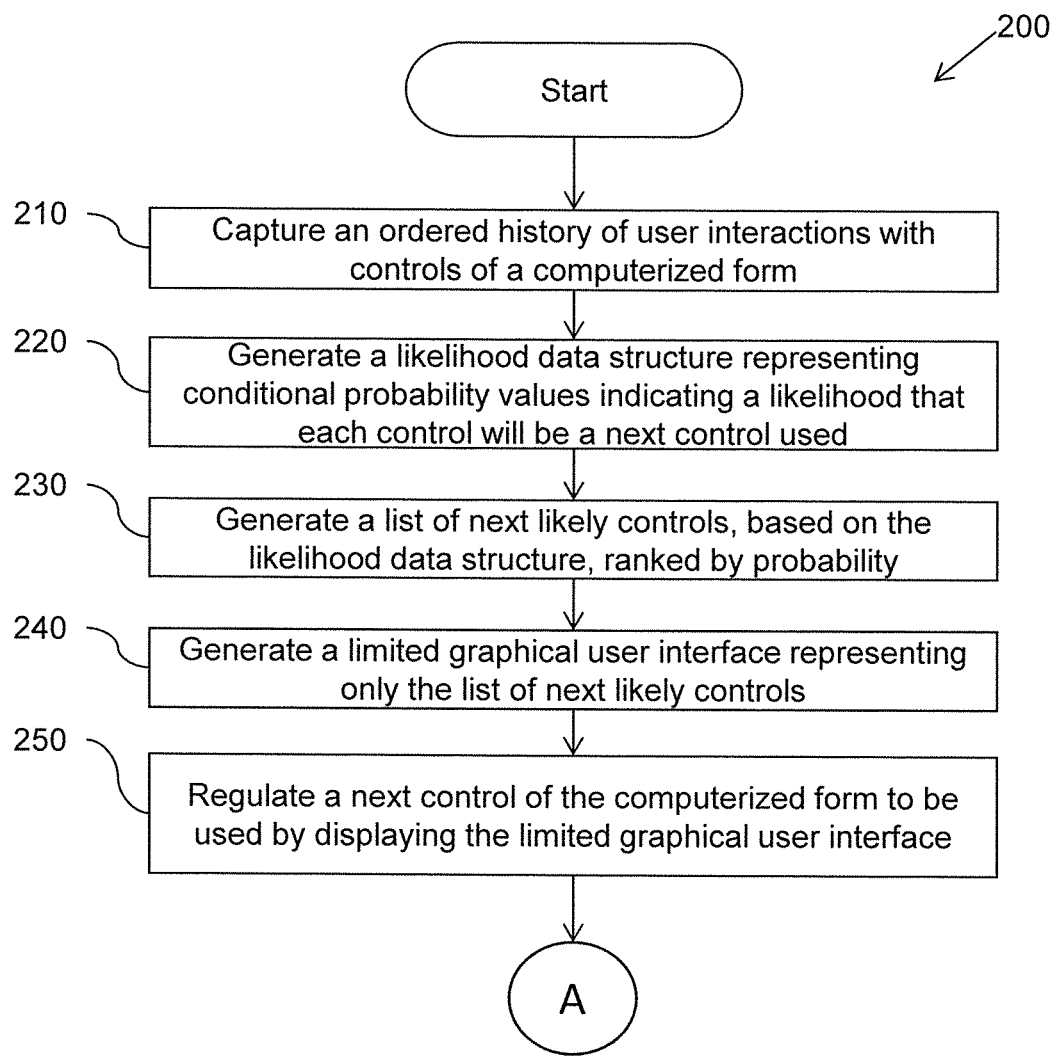
FIG. 2 illustrates a first part of one embodiment of a method, which can be performed using the core path logic of the computer system of FIG. 1, to adaptively anticipate next user interactions with a computer application.
Figure 3:
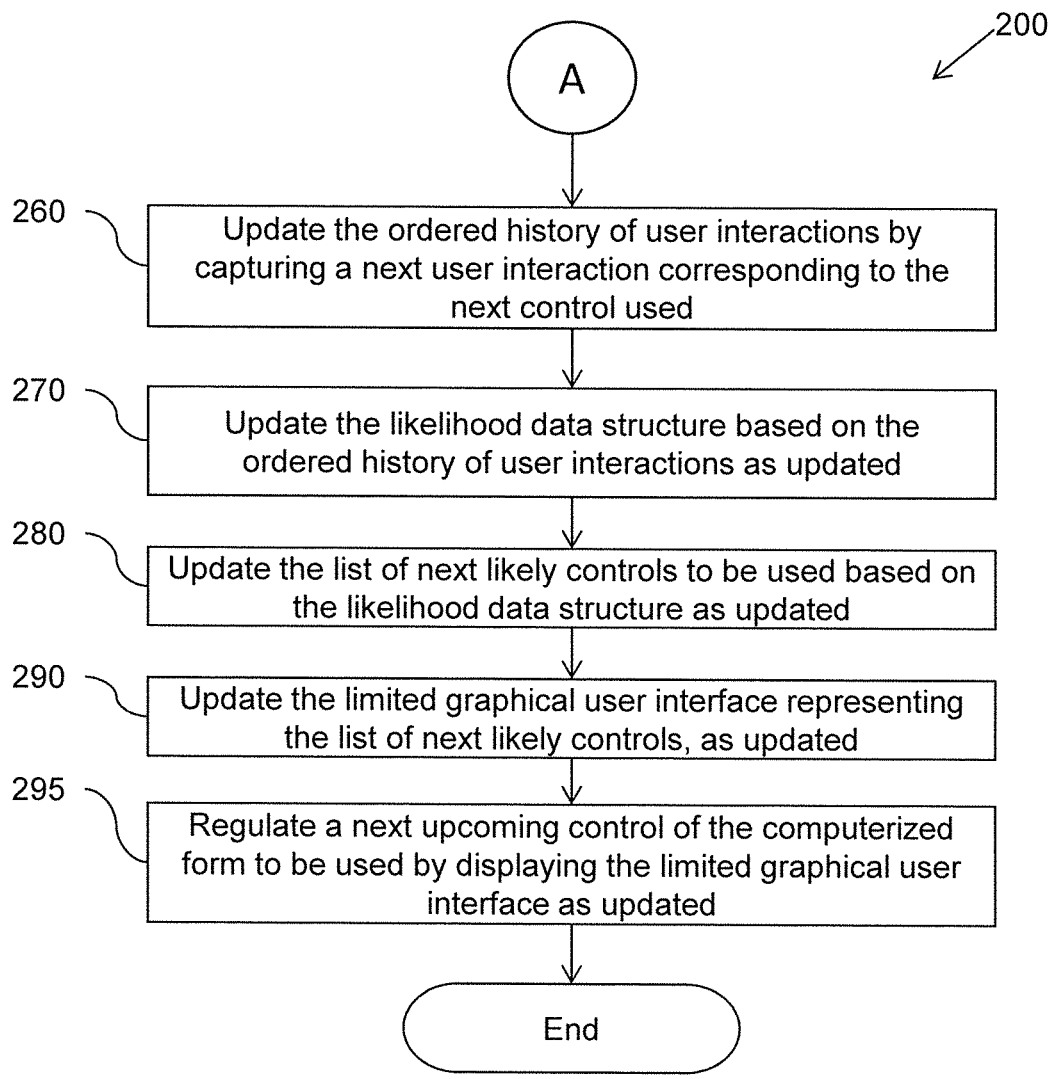
FIG. 3 illustrates a second part of one embodiment of a method, which can be performed using the core path logic of the computer system of FIG. 1, to adaptively anticipate next user interactions with a computer application.

FIG. 2 and FIG. 3 illustrate one embodiment of a method 200, which can be performed using core path logic 110 of the computer system 100 of FIG. 1, to adaptively anticipate next user interactions with a computer application 120. Method 200 describes operations of core path logic 110 and is implemented to be performed by core path logic 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that core path logic 110 is provided which allows a user to focus on controls of computerized forms that the user tends to use over and over again in a certain order. Method 200 will also be described from the perspective that core path logic 110 can be used with any legacy computer application 120 without affecting the operational integrity of the legacy computer application 120.

Upon initiating method 200, at block 210, an ordered history of user interactions with controls is captured within a controls data structure. The controls are associated with a computerized form provided by a legacy computer application executing on a computing device. In one embodiment, capturing the ordered history of user interactions is accomplished by leveraging an existing messaging framework of the legacy computer application. Block 210 is performed by capturing logic 114 of core path logic 110, in accordance with one embodiment.

At block 220, a likelihood data structure is generated by applying a probabilistic model to the ordered history of user interactions. The likelihood data structure represents conditional probability values indicating the likelihood that each control of the computerized form will be a next control that is used by the user. The conditional probabilities are conditioned on the ordered history of user interactions. That is, the probability that a particular control will be the next control used by the user depends on (i.e., is conditioned on) the previous controls (and the order of the previous controls) used by the user (e.g., especially the last few controls used). Block 220 is performed by probabilistic model logic 116 of core path logic 110, in accordance with one embodiment.

At block 230, a list of next likely controls to be used by the user is generated based on the likelihood data structure. The next likely controls are ranked within the list according to the conditional probability values associated with the next likely controls. In one embodiment, generating the list of next likely controls includes generating a sequence of cumulative probability values. The sequence is generated by iteratively summing the conditional probability values, of the controls represented in the likelihood data structure, in an order from a highest to a lowest conditional probability value. The sequence of cumulative probability values is compared to a threshold value. The controls that are selected as the list of next likely controls are those controls corresponding to a cumulative probability value that is greater than and closest to the threshold value. Block 230 is performed by probabilistic model logic 116 of core path logic 110, in accordance with one embodiment.

Figure 4:
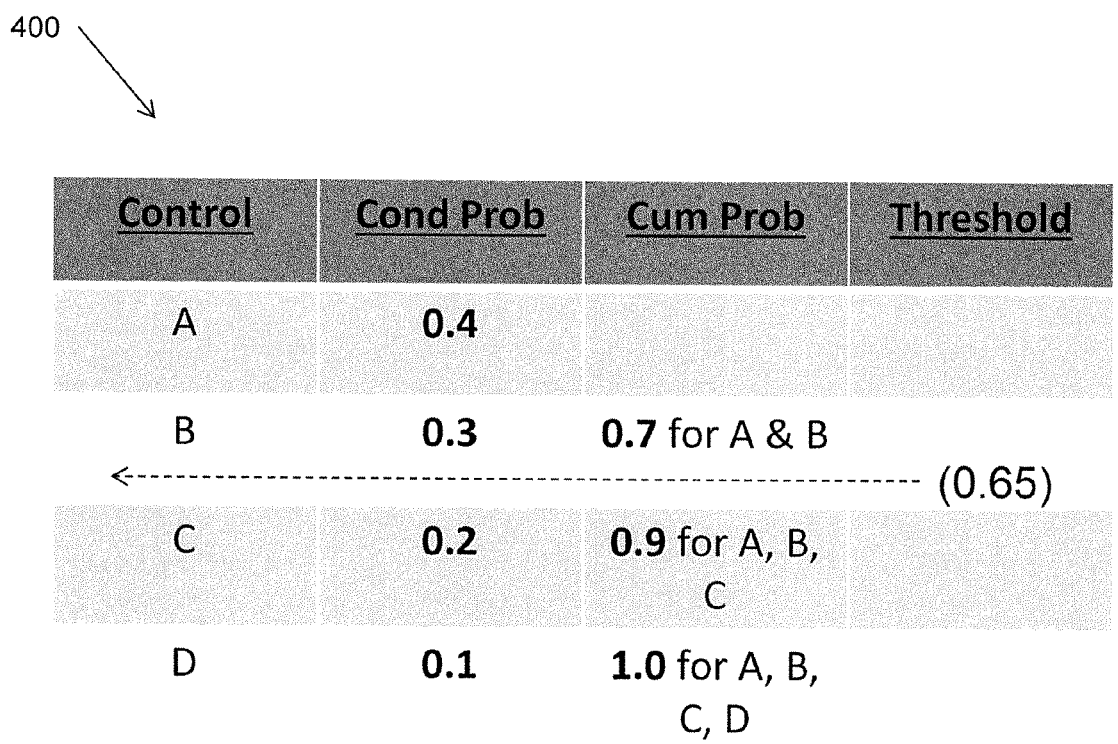
FIG. 4 graphically illustrates an example embodiment of generating a list of next likely controls to be used by a user, as may be performed by the system of FIG. 1 as part of the method 200 of FIGS. 2-3.

As an example, referring to FIG. 4, the table 400 shows four (4) controls A, B, C, and D having conditional probability values of 0.4, 0.3, 0.2, and 0.1, respectively, as identified in a likelihood data structure. Furthermore, table 400 shows a threshold value of 0.65. The threshold value may be preset by a user, for example, or may be determined based on the type of computing device. To determine which controls should end up in the list of next likely controls, the conditional probability values for controls A and B are summed to give a cumulative probability value of 0.7. The conditional probability values for controls A, B, and C are summed to give a cumulative probability value of 0.9. Finally, the conditional probability values for controls A, B, C, and D are summed to give a cumulative probability value of 1.0.

Comparing the resultant sequence of cumulative probability values (0.7, 0.9, and 1.0) to the threshold value of 0.65, it is determined that the cumulative probability value of 0.7 is greater than and closest to the threshold value of 0.65. Therefore, the controls A and B, which correspond to the cumulative probability value of 0.7, are selected to go into the list of next likely controls. Furthermore, control A comes before control B in the list since the conditional probability value for control A is greater than the conditional probability value for control B. If the threshold value was instead 0.75, for example, then controls A, B, and C would be selected to go into the list of next likely controls, using a similar process.

The threshold value may be preset based on the type of computing device 105. For example, the threshold value may be lower for a mobile phone computing device having a smaller display screen (effectively filtering out more controls) and higher for a desktop computing device having a larger display screen (effectively providing more controls). Also, as an alternative, those controls that do not end up in the list of next likely controls may still be accessible and shown on the limited graphical user interface as a "collapsed" icon, for example. A user may have the option to select the collapsed icon to access the other controls that have been filtered out. In one embodiment, the threshold value may be user configurable.

Referring again to FIG. 2, at block 240, a limited graphical user interface is generated. The limited graphical user interface is limited (e.g., with respect to the legacy graphical user interface provided by the legacy computer application 120) in the sense that it represents the list of next likely controls to the exclusion of other controls of the computerized form. The legacy graphical user interface provided by the legacy computer application 120 provides all of the controls of the computerized form. Method 200 generates a new graphical user interface (i.e., a limited graphical user interface) providing only those controls that have ended up in the list of next likely controls. In one embodiment, the limited graphical user interface is implemented as an extension of the legacy computer application to maintain the operational integrity of the legacy computer application. The limited graphical user interface is generated by visual user interface logic 112, in accordance with one embodiment.

At block 250, the limited graphical user interface, representing the list of next likely controls, is displayed to the user via a display screen 120 to regulate (control) a next control of the computerized form to be used by the user. That is, the controls that are determined to likely be used next are presented to the user via a graphical user interface that is tailored to those likely controls. Regulating (controlling) a next control to be used by the user is performed by visual user interface logic 112 by, for example, making a most-likely control of the next likely controls more pronounced when displayed, in accordance with one embodiment.

Figure 5A:
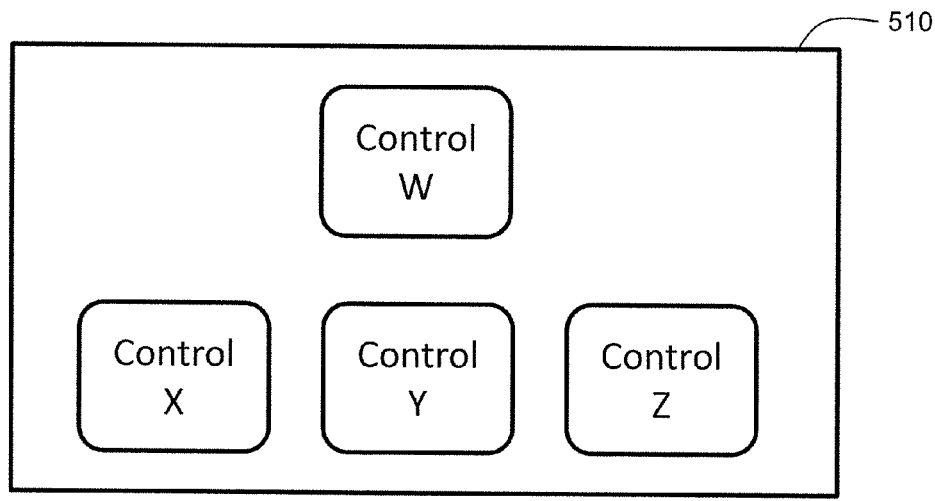
FIGS. 5A-5C illustrate example embodiments of limited graphical user interfaces that can be generated by the core path logic of FIG. 1 as part of the method of FIGS. 2-3.
Figure 5B:
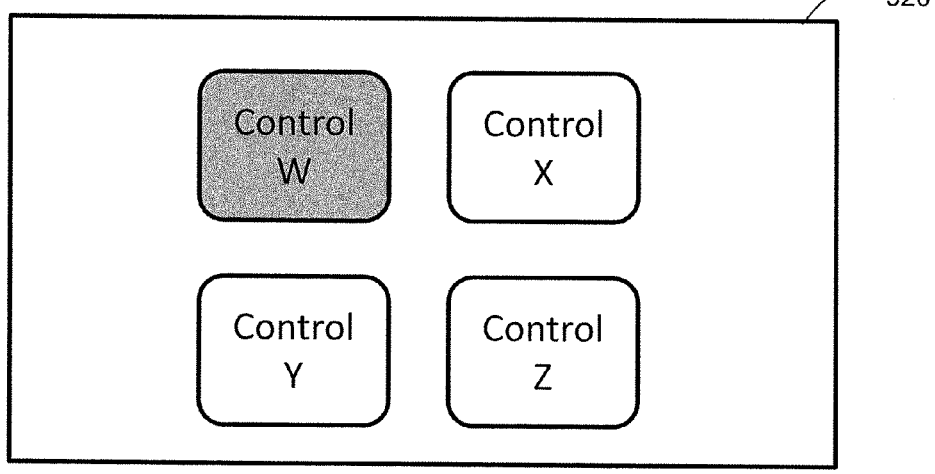
Figure 5C:
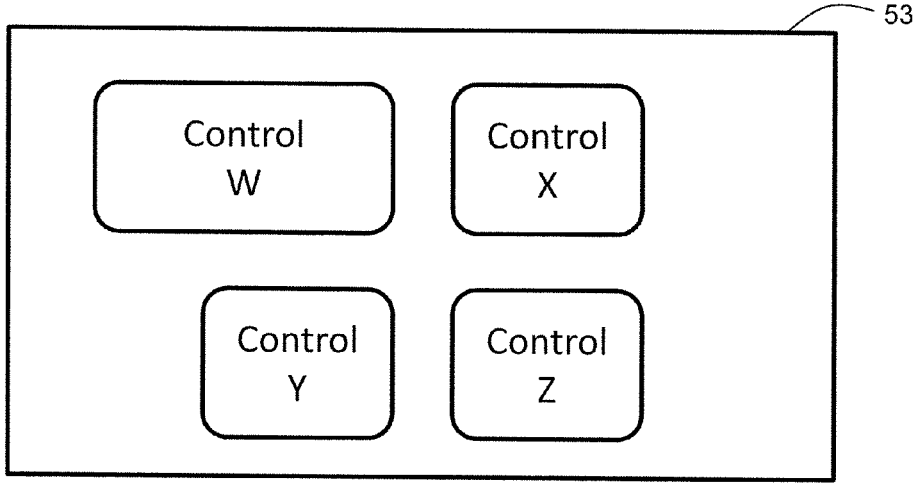

As an example, FIGS. 5A-5C illustrate example embodiments of limited graphical user interfaces that can be generated by core path logic 110 of FIG. 1 as part of the method 200 of FIGS. 2-3. FIG. 5A shows a limited graphical user interface 510 showing controls W, X, Y, and Z which are from a list of next likely controls. Control W is distinctly positioned above controls X, Y, and Z to indicate that control W has the highest conditional probability value and is, therefore, the next most-likely control to be used by the user.

Similarly, FIG. 5B shows another limited graphical user interface 520, showing the controls W, X, Y, and Z. Control W is distinctly high-lighted to indicate that control W has the highest conditional probability value and is, therefore, the next most-likely control to be used by the user. FIG. 5C shows still another limited graphical user interface 530, showing the controls W, X, Y, and Z. Control W is distinctly enlarged to indicate that control W has the highest conditional probability value and is, therefore, the next most-likely control to be used by the user. In these ways, visual user interface logic 112 may regulate (control) a next control of a computerized form to be used by the user.

As an alternative embodiment, the limited graphical user interface may show all of the controls of a computerized form, but high-light or accentuate only those controls that end up in the list of next likely controls. Such an alternative embodiment does not deviate as severely from the original legacy graphical user interface provided by the legacy computer application 120.

Each time a user proceeds to use a next control of a computerized form presented by a limited graphical user interface, core path logic 110 adapts and updates the operation of the system 100. Referring to FIG. 3, as a user proceeds to use a next control of a computerized form, at block 260, the ordered history of user interactions is updated by capturing, within the controls data structure, a next user interaction corresponding to the next control used by the user. In this manner, the ordered history of user interactions is adaptively updated in real time as a user interacts with the controls of a computerized form. Block 260 is performed by capturing logic 114 of core path logic 110, in accordance with one embodiment.

At block 270, the likelihood data structure is updated based on the ordered history of user data as updated. In this manner, the list of next likely controls is adaptively updated in real time as a user interacts with the controls of a computerized form. At block 280, the list of next likely control to be used by the user is updated based on the likelihood data structure as updated. Block 270 and block 280 are performed by probabilistic model logic 116 of core path logic 110, in accordance with one embodiment.

At block 290, the limited graphical user interface, representing the list of next likely controls as updated, is updated to the exclusion of other controls of the computerized form. At block 295, a next upcoming control of the computerized form to be used by the user is regulated (controlled) by displaying the limited graphical user interface as updated, representing the list of next likely controls as updated, to the user via the display screen 130. Block 290 and block 295 are performed by visual user interface logic 112 of core path logic 110, in accordance with one embodiment.

In this manner, method 200 may be implemented on a computing device 105 hosting a legacy computer application 120. Method 200 interacts with the legacy computer application 120 without affecting the operational integrity of the legacy computer application 120. Method 200 provides an adaptive graphical user interface that provides a limited view to controls of computerized forms provided by the legacy computer application 120. The limited view provides those controls that are most likely to be used next by the user, based on a conditional probability analysis of past user interactions. In this way, the user is not overwhelmed by being shown a large number of controls, most of which the user is not currently interested in using.

Computing Device Embodiment

Figure 6:
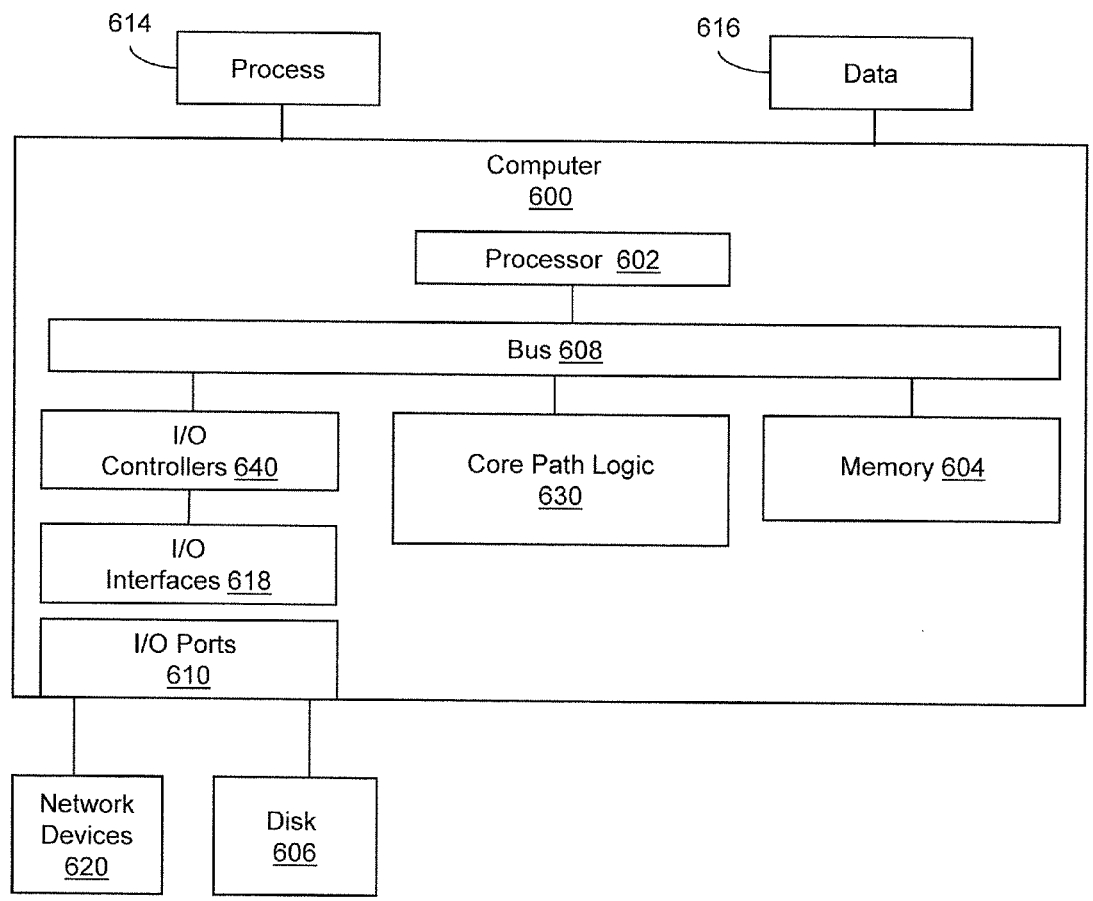
FIG. 6 illustrates an example embodiment of a computing device upon which core path logic of a computing system may be implemented.

FIG. 6 illustrates an example computing device that is configured and/or programmed with one or more of the example systems and methods described herein, and/or equivalents. FIG. 6 illustrates one example embodiment of a computing device upon which an embodiment of core path logic may be implemented. The example computing device may be a computer 600 that includes a processor 602, a memory 604, and input/output ports 610 operably connected by a bus 608.

In one example, the computer 600 may include core path logic 630 (corresponding to core path logic 110 from FIG. 1) configured with a programmed algorithm as disclosed herein to allow for automatically determining, in real time, the likely controls of a computerized form to be used next by a user. In different examples, logic 630 may be implemented in hardware, a non-transitory computer-readable medium with stored instructions, firmware, and/or combinations thereof. While logic 630 is illustrated as a hardware component attached to the bus 608, it is to be appreciated that in other embodiments, logic 630 could be implemented in the processor 602, a module stored in memory 604, or a module stored in disk 606.

In one embodiment, logic 630 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generation of a limited graphical user interface to show the next likely controls to be used by a user. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for adaptively anticipating user interactions with a computer application.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Systems, methods, and other embodiments have been described that are configured to adaptively anticipate user interactions with a computer application. In one embodiment, an ordered history of user interactions is captured. The user interactions are with controls of a computerized form provided by a legacy computer application executing on a computing device. A likelihood data structure is generated that represents conditional probabilities. The conditional probabilities indicate the likelihood that each control of the computerized form will be a next control used by the user. A list of next likely controls to be used by the user is generated based on the likelihood data structure. The next likely controls are ranked within the list according to the conditional probabilities associated with the next likely controls. A limited graphical user interface is generated which represents the list of next likely controls, to the exclusion of other controls of the computerized form. The limited graphical user interface is displayed to the user on a display device to regulate (control) a next control to be used by the user.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least one processor for executing instructions from a memory, the method comprising:
   capturing, via the at least one processor within a controls data structure, an ordered history of user interactions with controls of a computerized form provided by a legacy computer application executing on a computing device;
   generating a likelihood data structure, via the at least one processor, wherein the likelihood data structure represents conditional probability values indicating a likelihood that each control of the computerized form will be a next control to be used, conditioned on the ordered history of user interactions;
   generating, via the at least one processor, a list of next likely controls to be used based on the likelihood data structure, wherein the next likely controls are ranked within the list of next likely controls according to the conditional probability values associated with the next likely controls;
   generating, via the at least one processor, a limited graphical user interface representing the list of next likely controls to exclusion of other controls of the computerized form; and
   regulating, via the at least one processor, a next control of the computerized form to be used at least in part by displaying the limited graphical user interface, representing the list of next likely controls, via a display screen.

2. The method of claim 1, wherein the capturing of the ordered history of user interactions with the controls of the computerized form is accomplished, at least in part, by leveraging an existing messaging framework of the legacy computer application.

3. The method of claim 1, wherein the generating of the likelihood data structure includes applying a probabilistic model to the ordered history of user interactions.

4. The method of claim 1, wherein the generating of the list of next likely controls includes: generating a sequence of cumulative probability values by iteratively summing the conditional probability values, of the controls represented in the likelihood data structure, in an order from a highest conditional probability value to a lowest conditional probability value; comparing the sequence of cumulative probability values to a threshold value; and selecting, as the list of next likely controls, those controls corresponding to a cumulative probability value of the sequence of cumulative probability values that is greater than and closest to the threshold value.

5. The method of claim 1, further comprising: updating the ordered history of user interactions by capturing, within the controls data structure, a next user interaction corresponding to the next control used; updating the likelihood data structure based on the ordered history of user interactions as updated; updating the list of next likely controls to be used based on the likelihood data structure as updated; updating the limited graphical user interface representing the list of next likely controls, as updated, to the exclusion of other controls of the computerized form; and regulating a next upcoming control of the computerized form to be used at least in part by displaying the limited graphical user interface, as updated, representing the list of next likely controls, as updated, via the display screen.

6. The method of claim 1, wherein the limited graphical user interface is implemented as an extension of the legacy computer application to maintain operational integrity of the legacy computer application.

7. The method of claim 1, wherein the limited graphical user interface is displayed on the display screen to facilitate selection of the next control based on the conditional probability values associated with the list of next likely controls.

8. The method of claim 7, wherein the limited graphical user interface is displayed on the display screen to facilitate selection of the next control by distinctly high-lighting a display element associated with a control, of the list of next likely controls, having a highest conditional probability value.

9. The method of claim 7, wherein the limited graphical user interface is displayed on the display screen to facilitate selection of the next control by distinctly enlarging a display element associated with a control, of the list of next likely controls, having a highest conditional probability value.

10. The method of claim 7, wherein the limited graphical user interface is displayed on the display screen to facilitate selection of the next control by distinctly positioning a display element associated with a control, of the list of next likely controls, having a highest conditional probability value.

11. A computing system, comprising:
   a processor; a display screen configured to facilitate user interaction with a legacy computer application executing on the computing system;
   a capturing module stored in a non-transitory computer-readable medium and including instructions that when executed by the processor cause the processor to capture within a controls data structure an ordered history of user interactions with controls of a computerized form provided by the legacy computer application executing on the computing system;

a probabilistic model module stored in a non-transitory computer-readable medium and including instructions that when executed by the processor cause the processor to:

generate a likelihood data structure, wherein the likelihood data structure represents conditional probability values indicating a likelihood that each control of the computerized form will be a next control used, conditioned on the ordered history of user interactions, and generate a list of next likely controls to be used based on the likelihood data structure, wherein the next likely controls are ranked within the list of next likely controls according to the conditional probability values associated with the next likely controls; and a visual user interface module stored in a non-transitory computer-readable medium and including instructions that when executed by the processor cause the processor to:

generate a limited graphical user interface representing the list of next likely controls to exclusion of other controls of the computerized form, and regulate a next control of the computerized form to be used at least in part by displaying the limited graphical user interface, representing the list of next likely controls, via the display screen.

12. The computing system of claim 11, wherein the probabilistic model module is configured to generate the list of next likely controls at least in part by: generating a sequence of cumulative probability values by iteratively summing the conditional probability values, of the controls represented in the likelihood data structure, in an order from a highest conditional probability value to a lowest conditional probability value; comparing the sequence of cumulative probability values to a threshold value; and selecting, as the list of next likely controls, those controls corresponding to the cumulative probability value of the sequence of cumulative probability values that is greater than and closest to the threshold value.

13. The computing system of claim 11, wherein the visual user interface module is configured to display the limited graphical user interface on the display screen to facilitate selection of the next control based on the conditional probability values associated with the list of next likely controls.

14. The computing system of claim 11, wherein the capturing module is configured to leverage an existing messaging framework of the legacy computer application to facilitate capturing the ordered history of user interactions.

15. The computing system of claim 11, wherein the capturing module is configured to update the ordered history of user interactions by capturing a next user interaction corresponding to the next control used.

16. The computing system of claim 15, wherein the probabilistic model module is configured to: update the likelihood data structure based on the ordered history of user interactions as updated; and update the list of next likely controls to be used based on the likelihood data structure as updated.

17. The computing system of claim 16, wherein the visual user interface module is configured to: update the limited graphical user interface representing the list of next likely controls, as updated, to the exclusion of other controls of the computerized form; and regulate a next upcoming control of the computerized form to be used at least in part by displaying the limited graphical user interface, as updated, representing the list of next likely controls, as updated, via the display screen.

18. A non-transitory computer-readable medium storing instructions that when executed by one or more processors of a computing device, cause the computing device to at least:

capture within a controls data structure an ordered history of user interactions with controls of a computerized form provided by a legacy computer application executing on a computing device;

generate a likelihood data structure representing conditional probability values that indicate a likelihood that each control of the computerized form will be a next control used, conditioned on the ordered history of user interactions;

generate a list of next likely controls to be used based on the likelihood data structure, wherein the next likely controls are ranked within the list of next likely controls according to the conditional probability values associated with the next likely controls;

generate a limited graphical user interface representing the list of next likely controls to exclusion of other controls of the computerized form; and regulate a next control of the computerized form to be used at least in part by displaying the limited graphical user interface, representing the list of next likely controls, via a display screen.

19. The non-transitory computer-readable medium of claim 18, wherein the instructions to generate the list of next likely controls include instructions to: generate a sequence of cumulative probability values by iteratively summing the conditional probability values, of the controls represented in the likelihood data structure, in an order from a highest conditional probability value to a lowest conditional probability value; compare the sequence of cumulative probability values to a threshold value; and select, as the list of next likely controls, those controls corresponding to a cumulative probability value of the sequence of cumulative probability values that is greater than and closest to the threshold value.

20. The non-transitory computer-readable medium of claim 18, wherein the instructions further comprise instructions that when executed by the one or more processors cause the computing device to: update the ordered history of user interactions by capturing a next user interaction corresponding to the next control used; update the likelihood data structure based on the ordered history of user interactions as updated; update the list of next likely controls to be used based on the likelihood data structure as updated; update the limited graphical user interface representing the list of next likely controls, as updated, to the exclusion of other controls of the computerized form; and regulate a next upcoming control of the computerized form to be used at least in part by displaying the limited graphical user interface, as updated, representing the list of next likely controls, as updated, via the display screen.

* * * * *